United States Patent [19]

Hesner

[11] Patent Number: 4,585,263
[45] Date of Patent: Apr. 29, 1986

[54] AIR DEFLECTOR

[76] Inventor: Jay A. Hesner, 9536 Taylor St. N.E., Blaine, Minn. 55434

[21] Appl. No.: 650,650

[22] Filed: Sep. 14, 1984

[51] Int. Cl.⁴ .............................................. B62D 37/00
[52] U.S. Cl. .................................................. 296/1 S
[58] Field of Search ................... 296/1 S, 91; 160/13, 160/15

[56] References Cited

U.S. PATENT DOCUMENTS

| | | | |
|---|---|---|---|
| 1,645,775 | 10/1927 | Ross | 160/13 |
| 4,072,336 | 2/1978 | Ruzicka | 296/1 S |
| 4,159,843 | 7/1979 | Crossman | 296/1 S |
| 4,451,075 | 5/1984 | Canfield | 296/1 S |
| 4,506,870 | 3/1985 | Penn | 296/1 S |

Primary Examiner—Robert R. Song
Attorney, Agent, or Firm—Lawrence M. Nawrocki

[57] ABSTRACT

The present invention is a device for diverting air flow passing through the bed (18) of a pickup truck (10) up and over the tailgate (24) of that vehicle in order to reduce the resultant drag. The device includes a diversion element (30) which redirects the air flow upwardly and rearwardly within the bed (18) and over the tailgate (24). The diversion element (30) is detachably secured to the vehicle in a manner so that no damage is done to the body of the vehicle. One or a plurality of clamping members (52) can be employed for this purpose.

9 Claims, 6 Drawing Figures

AIR DEFLECTOR

TECHNICAL FIELD

The present invention relates broadly to the field of structures for improving the air flow characteristics of vehicles. More specifically, however, it is directed to an air deflector for use with a vehicle such as a pickup truck in order to reduce the air pressure and drag created by designed structural surfaces of the vehicle.

BACKGROUND OF THE INVENTION

It is a fundamental precept of vehicular travel that efficiency of the vehicle increases as negative aerodynamic forces exerted upon the vehicle during its travel decrease. For example, with aircraft, lift must exceed the weight of the aircraft, and propulsive thrust must exceed the drag upon the craft, in order for the airplane to even minimally function.

In the case of land vehicles, lift and weight vectors do not come into the picture other than to the extent that the weight of the vehicle bears upon horizontal components of frictional forces exerted upon the vehicle by the ground over which it is traveling. Essentially, however, the question is one of resolution of a propulsive thrust/drag model.

In a still atmosphere, when a land vehicle is starting, the question is merely one of propulsive thrust overcoming a drag force created by friction between the vehicle and the land surface. In the typical case, this is easily accomplished.

As the vehicle begins to move, however, relative wind becomes exerted upon vertical and oblique surfaces of the body of the vehicle. The system becomes further exaggerated if a vehicle is traveling in an environment where ambient wind conditions exist. Under such circumstances, the drag component normally present because of friction is additive with that created by both relative wind induced by movement of the vehicle and, when the true wind is in a direction opposite the direction of movement of the vehicle, the true wind.

Pickup trucks are vehicles which present unique problems with regard to the principles previously discussed herein. The typical pickup truck includes a storage compartment comprising an open storage bed. During movement of such a vehicle on a highway, for example, there is a tendency for the airstream to flow over the cab, downwardly into the bed, and, thereafter, through the bed and against the tailgate or a rear wall of the bed. Not only does such flow tend to blow contents carried within the truck out of the bed, but it acts as a retarding force.

Pickup trucks commercially purchasable are provided with sufficient horsepower to overcome the various drag forces exerted thereon during typical circumstances. Only in the utmost extreme wind conditions might operation of the vehicle prove impossible.

Nevertheless, owners and operators of pickup trucks need be concerned about other factors. The retarding force exerted upon the tailgate of such a truck is adversely reflected in the lowered gasoline mileage which can be obtained. During one test conducted, it was determined that the force exerted upon a pickup truck tailgate while traveling at 55 miles per hour was 1.5 pounds per unit area. As can be seen, the total force exerted upon the vehicle as a result of various wind vectors acting upon the tailgate can be substantial. Such negative aerodynamic forces can significantly decrease the gasoline mileage obtained by the vehicle.

Various solutions have been attempted in order to solve these problems. One measure that owners and operators of pickup trucks have utilized is removal of the surface which can be encountered by the wind force by lowering the tailgate during operation of the vehicle. By taking such action, the airstream is allowed to pass through the truck bed and out thereof without encountering any obstacle.

Such a solution certainly has drawbacks. Most pickup trucks do not provide means for securing the tailgate in a down position. As a result, as the vehicle moves over a road surface and encounters bumps and other irregularities in the road, the tailgate will "bounce" and can be damaged. Additionally, if something might be being carried in the bed of the truck which might not, of itself, induce a significant drag, the tailgate in a down position might permit the cargo to fall out of the vehicle and onto the road. Not only may the cargo be damaged, but significant hazards might be presented to other drivers.

Another attempted solution is one illustrated in U.S. Pat. No. 4,072,336 which was issued to Leo J. Ruzicka on Feb. 7, 1978 for a device entitled VACUUM SPOILER FOR PICKUP. The device of that patent would provide for the provision of a slot cut through the front portions of the pickup truck bed. The slot would extend laterally with regard to the direction of movement of the vehicle. Air flow passing upwardly through the slot at high speeds would tend to spoil a vacuum created behind the cab of the vehicle. The theory of the Ruzicka structure is that, as a result of the vacuum reduction, better gas mileage can be achieved.

A structure in accordance with the Ruzicka patent does, however, still have certain disadvantages. Because of the air flow over the cab and down into the bed, a reduced pressure would be created in the bed, and air coming from below the vehicle could be sucked up through the slot at a very high velocity. As a result, any cargo carried ip the bed of the truck might become dislodged or even thrown out of the vehicle. Additionally, even with the vacuum reduction behind the cab, some air flow will still impinge upon the tailgate, and additional drag will be created.

Other attempted solutions have sought to divert air flow over the cab upwardly so that it will not confront the tailgate. Such a structure is illustrated in U.S. Pat. No. 4,159,853 (Crossman). That patent issued on July 3, 1979 upon an application filed on Sept. 28, 1977. The device of that patent is entitled PICKUP TRUCK AIR DEFLECTOR. The structure essentially comprises an airfoil for merely diverting air flow in a direction upwardly. The theory of operation of the structure is that flux lines of the air flow will be displaced sufficiently so that little, if any, air flow is brought to bear upon the tailgate. Still, however, while there may be some reduction of the drag created by impingement of the air flow upon the tailgate, there will be some pressure exerted against that structure.

U.S. Pat. No. 4,451,075 (Canfield) illustrates another type of structure designed to solve the problems of the prior art. The structure of the Canfield patent is somewhat akin to the present invention. It provides a sloping backwall positionable in the rear portions of the bed of a pickup truck in order to provide an airfoil, whereby wind resistance caused by engagement of the tailgate by the wind is reduced to commensurately increase gasoline mileage. Additionally, the sloping wall, in combination with the tailgate, functions to provide a compartment which can be used as a tool box or other storage compartment.

As with other solutions which have been attempted, however, the structure of the Canfield patent has certain drawbacks. While the sloping wall may very efficiently function to reduce the drag exerted upon the vehicle in which it is installed, it virtually becomes a permanent fixture of the truck. If the owner of the truck purchases a device in accordance with the Canfield patent, and subsequently purchases another truck whose bed has different dimensions, the structure in accordance with Canfield cannot be removed and installed in the newer vehicle. Even if it could, however, the older truck may prove less saleable because of holes which need to be drilled into the truck wheel wells and interior side walls of the truck bed. Similarly, even if the truck owner does not sell a vehicle in which the Canfield structure is installed, but, rather, wishes to remove the improvised tool box in order to increase hauling capacity of the vehicle, the drilled holes are present and can be acted upon by the environment to accelerate corrosion and deterioration.

The present invention is an improved air deflector which goes far to solve the problems of the prior art. It is designed specifically for use with pickup trucks, but it can be used with such trucks having beds with virtually any dimension currently available commercially. Additionally, it need not be permanently affixed to the vehicle in a way so that damage would be inflicted thereupon.

SUMMARY OF THE INVENTION

The present invention is a device which can be used to reduce drag imposed upon a moving vehicle which might be induced as a result of relative air flow about the vehicle impinging upon generally vertically extending surfaces thereof. For example, as a vehicle such as a pickup truck moves over the ground, a relative air flow is induced which flows over the cab, down into the truck bed, and impinges upon the tailgate. The present device functions to minimize or eliminate the drag thereby created. It includes, as part of its structure, an element which deflects the air flow upwardly and over the vertical surface such as a tailgate. The device incorporates a deflecting surface for this purpose. The surface is positionable proximate the generally vertical surface over which air flow is to be deflected, and intermediate the generally vertical surface and the direction from the which the relative air flow is approaching. The deflecting surfaced is disposed obliquely with respect to the horizontal so that air attacking the deflecting surface proximate a bottom end thereof will turn and flow up a ramp formed by the deflecting surface. The device further includes means for detachably securing the element to the vehicle so that no damage will be occasioned either during attachment, operation, or removal of the element.

A plurality of clamping members can be carried by a panel which may function as the diversion element. The panel can carry these clamping members proximate an edge thereof which would be positioned closely proximate an upper edge of the tailgate. Each clamping member can include a pair of resilient fingers, each generally parallel to its corresponding finger, which function to clip the upper edge of the tailgate therebetween.

Depending upon the distance between the lateral walls of the truck bed, any number of clamping members can be utilized. Although one member might accomplish the desired goal of securing the panel to the tailgate, it most likely would be optimum to use either two or three of such members.

Although the resilient fingers of the clamping members would be so constructed to minimize the likelihood of damage being inflicted upon the tailgate to which the panel would be detachably secured, additional means can be incorporated to further minimize the likelihood of damage. For example, the fingers of each clamping member could be coated with a plastic material.

In order to enable usage of the present invention with any pickup truck having a dimension transverse to the direction of movement of the vehicle which is within a range occupied by such dimensions of typically sized trucks, the diversion element can, in fact, comprise two panels together forming a deflecting surface. Neither panel by itself would be as long as the dimension between lateral walls of even the smallest pickup truck, but the lengths of the panels, jointly, would be longer than the dimension between the lateral walls of even the largest pickup truck commercially available. As a result, the diversion element could be adjusted by telescoping one of the panels relative to the other to make it a length closely approximating the dimension of the truck bed transverse to the intended direction of movement of the truck.

Various types of structures could be utilized to accomplish this telescoping movement. The invention specifically envisions the formation of a plurality of parallel dovetail-shaped channels in a surface of one of the panels and a corresponding number of dovetail fittings formed on the surface of the other panel which would engage the surface of the first panel having the channels formed therein. The fittings would be parallel and spaced at a distance similar to the distance between the channels. As a result, the two panels could be mated together and be allowed to telescope with opposite faces thereof closely adjacent one another.

Although the present invention does much to solve various problems of the prior art, it could possibly prove ineffectual if wind entering the bed swirled and lifted the panels from their position in engagement with the floor of the truck bed. In order to minimize the likelihood of this happening, the assembly of the two panels can be balasted in order to more forcefully urge a forward end of the assembly down into engagement with the floor of the truck bed.

The present invention is thus an improved air deflector for use with pickup trucks and similar vehicles to deflect air flow up and over a tailgate or other generally vertical extending wall. More specific features and advantages obtained in view of those features will become apparent with reference to the detailed description of the invention, appended claims, and accompanying drawing figures.

DETAILED DESCRIPTION OF THE INVENTION

Figure 1:
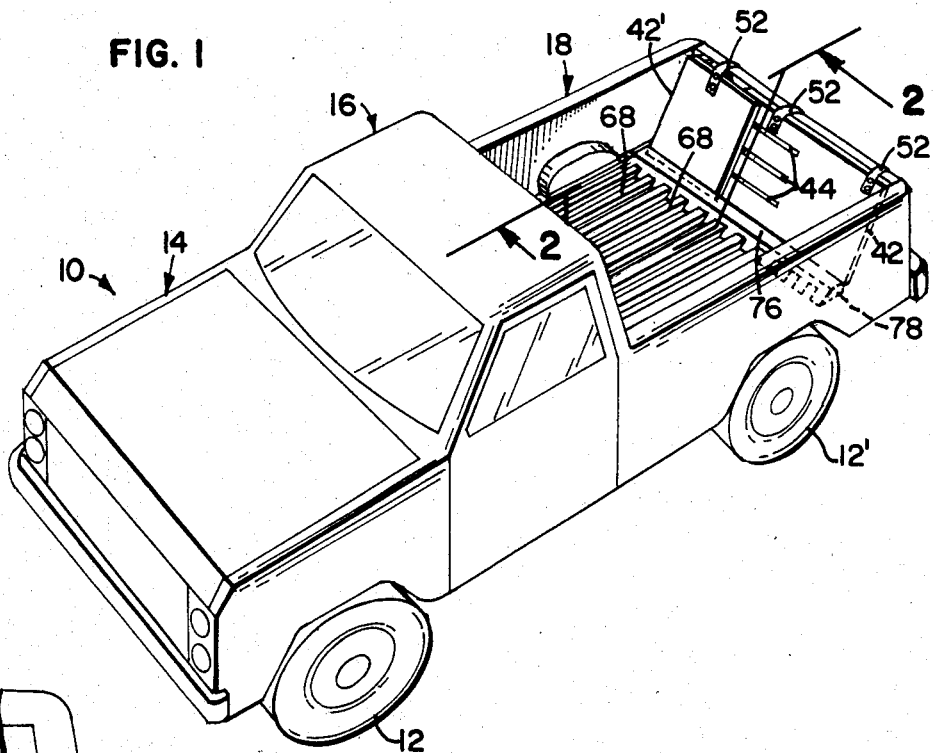
FIG. 1 is a perspective view of a land vehicle such as a pickup truck with which the present invention can be utilized.

Referring now to the drawings wherein like reference numerals denote like elements throughout the several views, FIG. 1 illustrates a pickup truck 10 of conventional construction. The truck 10 includes a body supported by a plurality of wheels 12 for movement over a ground surface. The body of the truck comprises an engine compartment 14, a cab or passenger compartment 16, and a load carrying bed 18.

The bed 18 is defined by a rear wall 20 of the cab 16, a pair of lateral walls 22, a tailgate 24 which provides access to the bed 18 during loading and unloading operations and a bed floor 26. Although not true with all pickup trucks commercially available, frequently wheel wells 28 which accommodate the rear truck wheels 12' protrude inwardly into the bed 18.

Typically, the floor 26 of a pickup truck bed 18 is corrugated. By so structuring the bed floor 18, the strength of that member can be maximized, and increased loads can be accommodated by the vehicle.

As discussed in the BACKGROUND OF THE INVENTION portion, as the truck 10 moves along the ground, a relative air flow will be created over the cab 16 and down into the bed 18. This flow will impinge upon the tailgate 24 to reduce the efficiency of operation of the vehicle.

The present invention is an apparatus for reducing drag so created, by diverting the air flow up and over the tailgate 24. The apparatus includes an element 30 to so divert flow passing through the bed of the truck 10. The element 30 would, in a preferred embodiment, comprise a panel 32 having a deflecting surface positioned between the attacking air flow and the tailgate 24. Such a surface would be positioned obliquely, with one edge 34 thereof closely proximate an upper edge 36 of the tailgate 24, and a second, opposite edge 38 forwardly from the edge 34 proximate the tailgate 24 and lower than that edge 34. Such an obliquely disposed deflecting surface could, thereby, extend from a position at the truck's bed floor 26 intermediate the cab 16 and the tailgate 24, upwardly and rearwardly to the upper edge 36 of the tailgate 24.

As seen in the figures, the diversion element 30 having the deflecting surface formed therein can comprise a pair of panels 32, 40 mounted to one another in order to define closely proximate parallel planes. Each of first and second panels 32, 40 can be structured in order to have a length shorter than the distance between the lateral walls 22 of the truck bed 18. Together, however, the panels 32, 40 would have a length exceeding the distance between the lateral walls 22. In order to make the present apparatus truely universal in its applicability for use, each of the panels 32, 40 can be given a length shorter than the distance between lateral walls of the smallest pickup truck commercially available and the joint length of the panels be made to exceed the distance between lateral walls of the largest pickup truck commercially available. Since the invention envisions means for securing the panels 32, 40 to each other in a telescoping fashion along an axis aligned with their lengths, the relative positions of the panels 32, 40 can be adjusted so that opposite lateral edges 42, 42' of the diversion element 30 can be made to engage the opposite lateral walls 22 of any pickup truck with which the apparatus is used.

A dovetail groove and fitting arrangement can be employed in order to effect the telescoping action of the two panels 32, 40. A first of the panels 32 can be provided with a plurality of generally parallelly extending grooves 44 aligned in the direction of the axis of telescoping of the panels 32, 40. Although not essential, the grooves 44 would typically be spaced from one another at equal distances.

The second panel 40 can be provided, on a surface facing the surface in which the grooves 44 in the first panel 32 are formed, with a corresponding plurality of dovetail-shaped fittings 46. As with the grooves 44, these fittings 46 would extend parallel to one another and along a direction of the axis of telescoping of the two panels 32, 40. As with the grooves 44 also, the fittings 46 need not be spaced from one another at the same distances, but, typically, such spacing would be incorporated. In any case, however, the spacing between two particular adjacent fittings 46 would correspond to the spacing between the two corresponding adjacent grooves 44.

Figure 3:
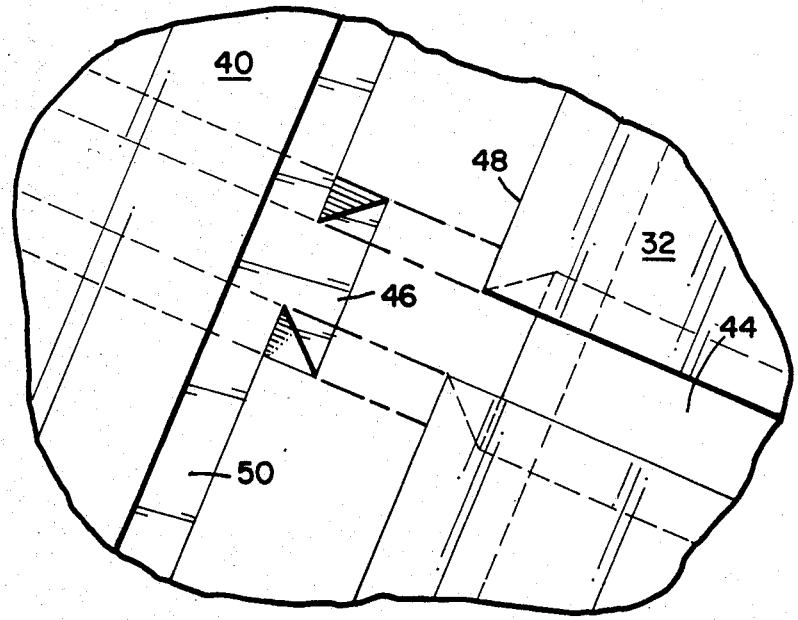
FIG. 3 is an enlarged exploded view showing the manner in which a pair of panels comprising the invention's diversion element can be mated together.

As can be seen, the panels 32, 40 can be mated by use of this structure. In assembling the apparatus (that is, in mating one panel to the other), the panels 32, 40 can be brought so that edges 48, 50, as seen in FIG. 3, approach one another in a slightly offset fashion in order that the fittings 46 in one panel can be received in the grooves 44 of the other panel. Once this action is accomplished, the length of the diversion element 30 can be adjusted by sliding the panels 32, 40 relative to one another along the axis of relative movement until a desired length of the element 30 is achieved. The assembly can, thereafter, be placed into position in the bed 18 of the pickup truck 10 with which it is to be used.

It is an important feature of the invention that, when secure in place in the bed 18 of a pickup truck 10 to accomplish its role of diverting air flow, while being capable of remaining securely in place, it will not inflict any damage by way of scratching or gouging upon surfaces of the truck. Neither lateral walls 22 nor the tailgate 24 will be damaged.

Figure 4:
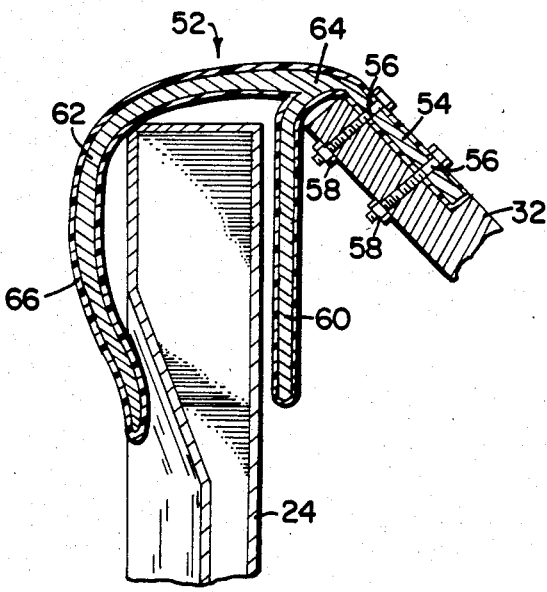
FIG. 4 is a side sectional view of the tailgate of a pickup truck illustrating a first clamping member for securing a diversion element to the tailgate.
Figure 5:
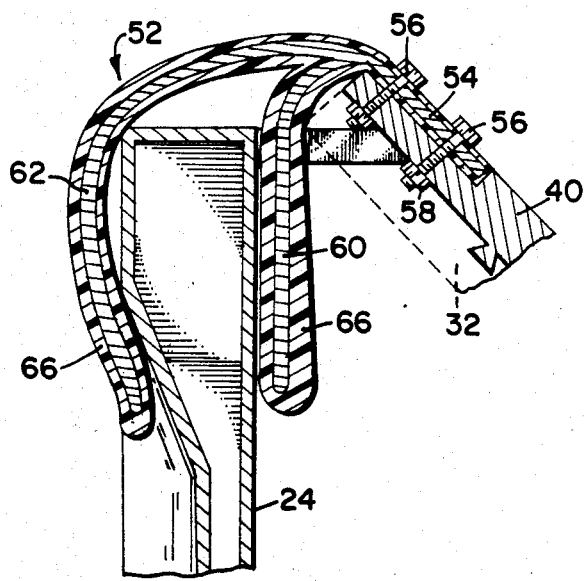
FIG. 5 is a side sectional view of the tailgate of a pickup truck illustrating a second clamping member for securing a diversion element to the tailgate.

Regardless of whether a single panel 32 or dual panel 32, 40 assembly is used to accomplish the air flow diversion function, at least one clamping member 52—typically permanently secured to the diversion element—is utilized for detachably securing the element 30 to the vehicle. A preferred structure for such a clamping member 52 is illustrated in FIG. 4. The member 52 includes a stem 54 which can be secured proximate an intended upwardly extending edge of the panel by any appropriate means. FIG. 4 illustrates a bolt 56/nut 58 arrangement for accomplishing this securing.

The member 52 further includes a pair of resilient fingers 60, 62 for securely grasping structures such as the upper edge of the tailgate 24 therebetween. A surface of an inner finger 60 can engage the surface of the tailgate facing the cab 16, and a surface of the outer finger 62 can engage an outwardly facing surface of the tailgate 24. Although FIG. 4 illustrates the resilient fingers 60, 62 extending from the stem 54 of the clamping member 52 in a rigid fashion, it will be understood that the invention contemplates embodiments wherein the finger assembly would be hinged to the stem 54.

Particularly in embodiments of the invention wherein multiple panels are used to form the diversion element 30, it would be appropriate to use more than one clamping member 52 to secure the element 30 to the tailgate 24 of the vehicle with which it is being used. When such multiple clamping members 52 are used, it would be appropriate to secure one near each lateral edge 64, 64' of the dual panel assembly. FIG. 1 shows an assembly wherein three clamping members 52 are used. Two of the members 52 are secured to the first panel 32 of the assembly, and one to the second panel 40.

With such structuring, it can be seen that, because of the offset of the second panel 40 relative to the first 32, the clamping member 52 secured to the second panel 40 would have to be structured differently than those secured to the first. In order to accomplish this different structuring, an intermediate portion 64 of the member 52 between the stem 54 and the resilient finger assembly would have to be somewhat elongated in order to account for the forward displacement of the second panel 40.

In certain embodiments, the resilient fingers 60, 62, and, in fact, the whole clamping member 52, can be coated with a plastic resinous material 66. Such coating 66 precludes a metal against metal engagement. As a result, the likelihood of infliction of damage to the truck tailgate 24 by the fingers 60, 62 would be minimized.

Figure 2:
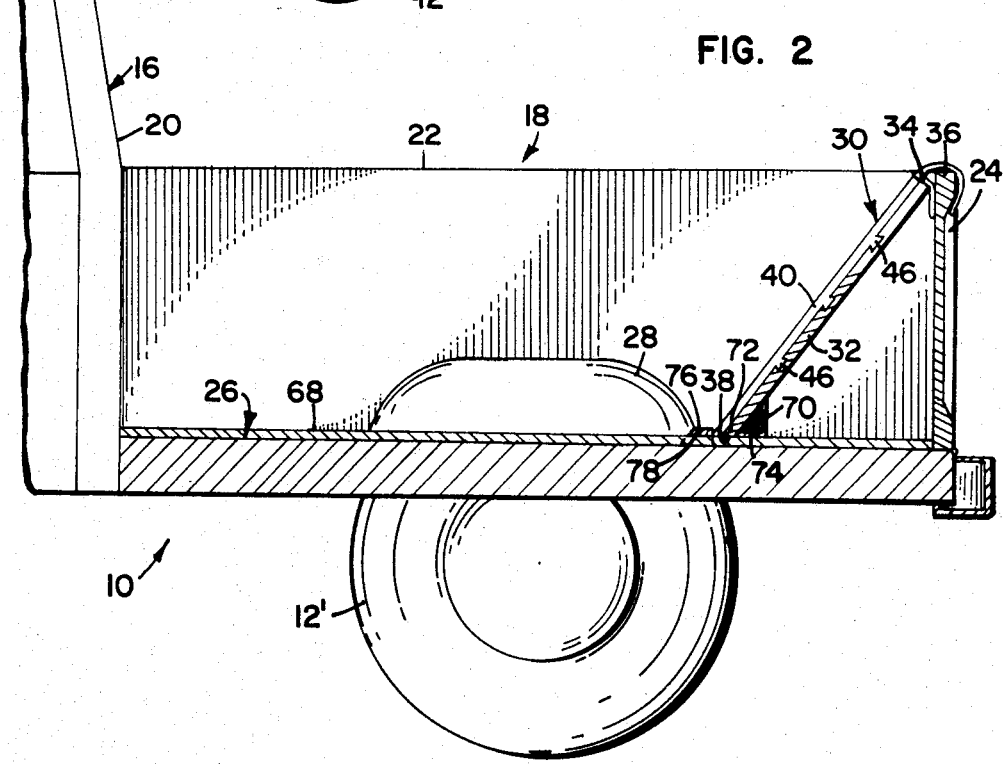
FIG. 2 is a view taken generally along the line 2—2 of FIG. 1.

In a number of situations, there may be a tendency to lift the deflection element 30 from its position in engagement with the floor 26 of the truck bed 18. For example, when the air flow over the cab 16 and through the truck bed 18 is irregular or there are excessive vibrations intermittently lifting the present apparatus from engagement with the bed floor 26, air may enter under the lower edge of the apparatus and create a pressure between the device 30 and the tailgate 24. The situation is further complicated by the fact that many commercially available pickup trucks have a corrugated construction bed floor 26 as seen in FIGS. 1 and 2. Even when the deflection element 30 is in engagement with upper surfaces of the corrugations 68, air flow may yet enter between the corrugations 68 and create the increased pressure between the panel or panels and the tailgate 24.

The present invention provides structure for eliminating these problems. Means can be provided to weigh down the lower edge or edges of the panel or panels by providing ballast means. As seen in FIG. 2, a triangularly constructed hollow member 70 can be secured, for example, to the lower edge 72 of the first panel 32 of a dual panel assembly. The triangularly constructed ballast means would be hollow and have access (not shown) to the cavity 74 so that the cavity 74 could be filled with appropriate material. Such material could comprise sand, lead pellets, or any other appropriate substance.

Additionally, the panel assembly described heretofore can be used in combination with a ramp 76 to initially deviate air flow through the bed 18 of the truck 10 over the lower, forward edge 72 of the diversion element 30. The ramp 76 would have a bottom surface 78 closely approximating the corrugated surface, or any other truck bed floor surface for that matter, in order to obviate the entry of air flow beneath the edge 72 of the diversion element 30 distal from its edge of attachment to the tailgate 24. Because of differing floors from truck to truck, the ramp 76 would, of course, have to be tailor made depending upon the particular model of truck with which the present invention is to be used.

Figure 6:
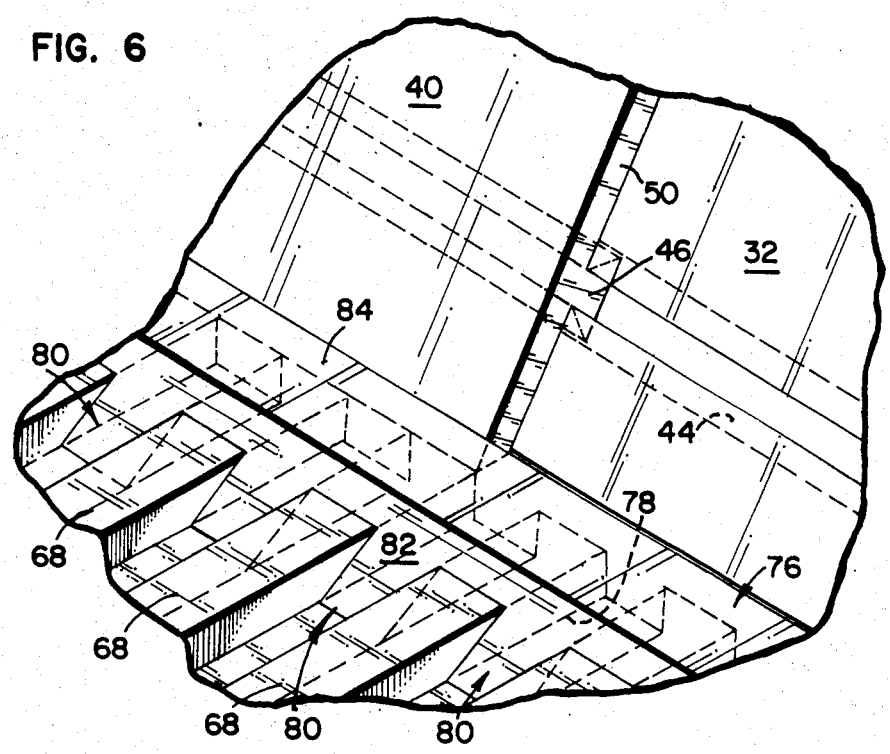
FIG. 6 is an enlarged perspective view illustrating in detail a ramp positionable on the floor of a pickup truck bed forward of the diversion member in order to deviate air flow initially over the diversion member.

As best seen in FIG. 6, the ramp member 76 would have a plurality of ribs 30 corresponding in number to the number of recesses between the corrugations 68 in the truck floor 26. These ribs 80 would be dimensioned to fit relatively closely within the channels between the corrugations 68. The ribs 80 would be provided with an upwardly and rearwardly extending deviation surface 82 so as to scoop the air flow upwardly as it proceeds rearwardly. The height of the ramp 76 would be sufficient so that an upper surface 84 thereof would be some measure above the edge 72 of the element 30 distal from its edge of attachment to the tailgate 24. Additionally, the ramp member 76 would be moved rearwardly in the bed 18 of the truck 10 and into engagement with the distal edge of the panel assembly so that the flow would be unlikely to divert back downwardly after passing over the ramp 76.

Numerous characteristics and advantages of the invention for which this application has been submitted have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. Apparatus for reducing drag upon an open vehicle, such as a pickup truck having an open bed defined between lateral walls thereof and a generally vertical surface, such as a tailgate, extending generally transversely to a direction of air flow through the bed, comprising:
    (a) a diversion element positionable between the lateral walls of the pickup truck, said element including a panel having a deflecting surface formed therein; and
    (b) at least one clamping member permanently attached to said element for detachably securing said diversion element to the tailgate of a pickup truck, said member having a pair of generally parallel fingers spaced from one another at a distance to permit said member to clamp onto a conventional pickup truck tailgate without damage thereto; and
    (c) wherein said panel deflecting surface is, when said diversion element is secured to a tailgate, disposed obliquely to the horizontal with said panel in a desired orientation and with an edge of said panel, distal from said clamping member, engaging the floor of the truck bed.

2. Apparatus in accordance with claim 1 wherein said panel extends substantially the full distance between the lateral walls of the pickup truck.

3. Apparatus in accordance with claim 1 wherein said panel has opposite lateral edges, and further comprising a plurality of said clamping members carried by said panel at locations spaced along its length, at least one of said clamping members being secured to said panel proximate each lateral edge thereof.

4. Apparatus in accordance with claim 3 wherein each of said clamping members is coated with a plastic material.

5. Apparatus in accordance with claim 1 wherein said diversion element further comprises:
   (a) a first panel having a length shorter than the distance between the lateral walls of a pickup truck with which said apparatus is to be used;
   (b) a second panel having a length shorter than the distance between the lateral walls of the pickup truck with which said apparatus is to be used, but wherein the joint lengths of said first and second panels exceeds the distance between the lateral walls; and
   (c) means for mounting said second panel to said first panel for relative movement along an axis aligning their lengths, and to define closely proximate, parallel planes.

6. Apparatus in accordance with claim 5 wherein said first panel has a plurality of generally parallel dovetail grooves aligned along said axis of alignment formed therein, and wherein said mounting means comprises, in combination with said grooves, a corresponding plurality of dovetail fittings formed on a surface of said second panel, said fittings extending generally parallelly and being spaced from one another at a distance the same as that between said grooves, wherein said fittings are received in said grooves to hold said panels together in a telescoping fashion and permit them to move relative to one another.

7. In combination with apparatus for reducing drag upon a pickup truck created by impingement of relative air flow upon the truck's tailgate, which apparatus includes a panel detachably securable to the tailgate to extend forwardly and downwardly form an upper edge of the tailgate and into engagement with a floor of the truck bed, wherein air flow moving through the bed as the truck moves forward is diverted upwardly and rearwardly over the tailgate; ramp means, disposable on the floor of the truck bed immediately forward of an edge of said panel, distal from a location at which it is secured to the tailgate, to initially deviate air flow over said distal edge, said ramp means having a bottom surface closely conforming to the floor of the truck bed.

8. Apparatus in accordance with claim 7 further comprising means, carried by said panel, for facilitating substantially continuous engagement of said edge of said panel, distal from a location at which it is secured to the tailgate, with the floor of the truck bed.

9. Apparatus in accordance with claim 8 wherein said facilitating means comprises ballasting means carried by said panel at said distal edge thereof.

* * * * *